US005123289A

United States Patent [19]

Potesta

[11] Patent Number: 5,123,289

[45] Date of Patent: Jun. 23, 1992

[54] TORQUE LIMITING TOOL

[75] Inventor: Richard E. Potesta, Chesterland, Ohio

[73] Assignee: Raybar Corporation, Chesterland, Ohio

[21] Appl. No.: 558,596

[22] Filed: Jul. 27, 1990

[51] Int. Cl.[5] ........................ G01L 5/24; B25B 23/143

[52] U.S. Cl. .................................... 73/862.23; 81/483

[58] Field of Search ........................ 73/862.23, 862.53; 81/478, 481, 483

[56] References Cited

U.S. PATENT DOCUMENTS

| | | | |
|---|---|---|---|
| 2,786,378 | 3/1957 | Ethington et al. . | |
| 2,877,645 | 3/1959 | Nealy . | |
| 2,918,834 | 12/1959 | Cranford . | |
| 3,165,014 | 1/1965 | Grabovac | 81/483 |
| 3,577,815 | 5/1971 | Bergquist . | |
| 3,599,515 | 8/1971 | Grabovac . | |
| 3,633,445 | 1/1972 | Aijala . | |
| 4,126,062 | 11/1978 | Solomon . | |
| 4,316,397 | 2/1982 | Skidmore et al. . | |

*Primary Examiner*—Charles A. Ruehl
*Attorney, Agent, or Firm*—Calfee, Halter & Griswold

[57] ABSTRACT

A hand tool, having at least one handle which will provide a tactile response at a predetermined adjustable torque value is provided. The handle includes first and second sections telescopingly and pivotally interconnected. Detent means, including a roller journalled on one section and an axial bore in the other section in which the roller normally resides is provided. The roller and other section are translationally movable with respect to each other. The roller is configured in the form of a segment of a sphere and biased into the end of the bore. The other section also includes means to allow but limit pivotal movement of the roller out of the bore such that it will provide a tactile response at a given torque level and return into the bore when torque is released.

10 Claims, 2 Drawing Sheets

TORQUE LIMITING TOOL

BACKGROUND OF THE INVENTION

1. Field of the Invention

This invention relates generally to torque limiting tools, and more particularly to torque limiting tools that have at least one handle that provides a tactile response when a given torque value applied thereto is exceeded.

2. Description of the Prior Art

Torque wrenches, particularly torque wrenches which release at a predetermined torque level are well known in the art. Such torque tools or torque release tools are generally provided with some type of detent mechanism which permits the application of torque up to a given predetermined level above which level some type of tactile action takes place to alert the user that the torque level has been exceeded. It is also conventional to provide various types of adjustment means for varying the torque level at which the torque response occurs.

These tools have taken many different forms. For example, U.S. Pat. No. 2,918,834 shows a tool which has a roller adapted to engage a cam element that has two laterally displaced sections such that the roller must be positioned precisely in the handle so as to move from one section to the other; i.e. from one side of the cam to the other. This requires precision placing of the cam with respect to the axis of the roller to assure proper engagement. U.S. Pat. No. 3,577,815 shows a similar arrangement wherein a roller engages side pins and moves from the position between the pins to a position on top of the pins at a predetermined torque level. This arrangement also requires a precise positioning of the pins with respect to the roller axis so that the engagement is properly aligned and directional. U.S. Pat. No. 2,877,645 discloses a roller engaging an incline which is not a torque limiting tool but a torque indicating tool; i.e. the farther up the incline the more the torque and the more the registration of the torque on the gauge. U.S. Pat. No. 2,959,078 (reissued as U.S. Pat. No. Re. 25,547) discloses a roller engaging an inclined plane, the plane being asymetrical with respect to the central axis.

U.S. Pat. No. 4,316,397 shows a combination of rollers and balls which allow for adjustment of a handle to change the torque setting without changing the length of the handle. U.S. Pat. No. 3,633,445 decribes a torque limiting device wherein a ball is captivated between two closed cylindrical bores to provide the tactile action. U.S. Pat. No. 2,786,378 discloses another type of ball arrangement wherein the ball engages a tapered slot which can be varied in size.

U.S. Pat. Nos. 4,126,062; 3,599,515 and 4,532,836 all show various configurations of torque limiting wrenches wherein solid cylinders are utilized captivated between slots with the cylinder tilting to provide torque release.

These patents all have various drawbacks. For example, in the case of the patents which utilize the rollers, either the roller must be precisely aligned; i.e. radially within the tube so that the roller engages surfaces which are directioned in nature in order to operate, or the mechanism does not operate in such a manner as to snap tactilly at the predetermined torque level and return because of an unbalanced condition to the non-released position when the torque level is reduced below the given amount.

Therefore, it is a principle object of this invention to provide an improved torque release handle for a tool which allows assembly in an unconstrained rotative configuration and which will tactilly release at an adjustable level and return to the original position upon release of the torque force.

SUMMARY OF THE INVENTION

According to the present invention, a hand tool having at least one handle which will provide a tactile response at a given, preferably adjustable, torque level is provided. The handle includes first and second sections which are disposed in telescoping relationship, and detent means interacting between the first and second sections to provide a tactile response responsive to a given torque force applied to the handle. The detent means includes roller means journalled on an axle carried by one member of the handle and cavity or bore means formed in the other member. The cavity or bore means includes a section generally circular in transverse section, and the roller means has a surface thereon shaped in axial section to mate with the surface of the cavity and disposed to rollingly engage the cavity or bore. Biasing means are provided normally biasing the roller means into the cavity, yet permitting limited movement out of said cavity when the torque exceeds the predetermined value. Means are provided to constrain the movement of the roller out of said cavity to a position that will cause the roller to return to the cavity when the torque is reduced below the given value.

DESCRIPTION OF THE PREFERRED EMBODIMENT

Figure 3:
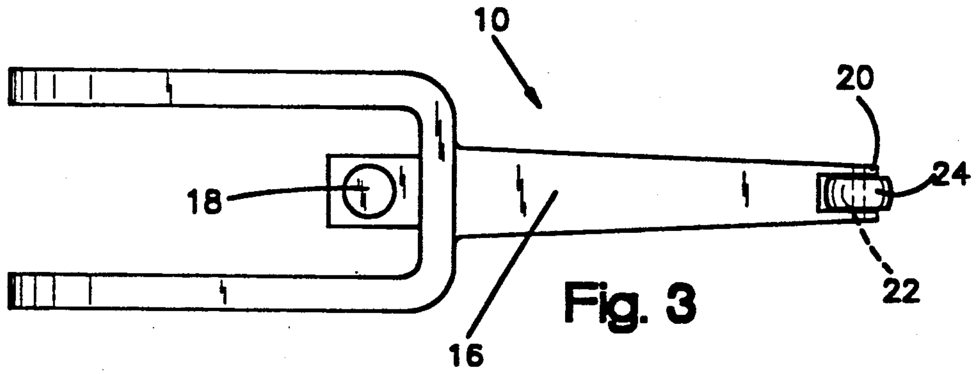
FIG. 3 is a detail plan view of the jaw section of the tool of FIGS. 1 and 2.
Figure 4:
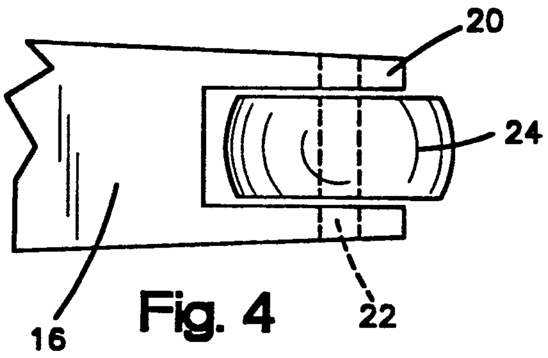
FIG. 4 is an enlarged detail view of the yoke end of the jaw section supporting the roller.

Referring now to the drawing, an improved torque handle for a tool having a detent release mechanism, according to this invention, is shown. The torque handle has a jaw section 10 telescoping engaging a handle section 12. The handle section 12 includes a tubular member 14 which slides over and engages a stem 16 of the jaw section 10. The jaw section 10 and handle section 12 are pivotally interconnected by means of a pivot pin 18. The stem 16 of the jaw section 10 is provided at one end with a yoke 20 (see FIGS. 3 and 4 particularly). The yoke 20 mounts an axle 22 (having a central axis **22*a* (FIG. 6)) which journals a roller 24 thereon for rotation. The roller 24 has its outer surface shaped as a segment of a sphere as can be seen in FIG. 4**. This configuration is to mate with the configuration of its mating surface as will be explained presently.

The jaw section 10 may have a jaw member 26 secured at one end thereof. The particular configuration of the jaw is not critical to the operation of the release mechanism of the present invention. Indeed, the present invention can work with a single handle tool such as a wrench wherein the torque is applied by a rotating movement or as a lever when the tool is designed as a prying type tool or it could be one handle of a plier type tool wherein a pair of handles are pivotally interconnected, with this handle providing the torque release function.

Figure 5:
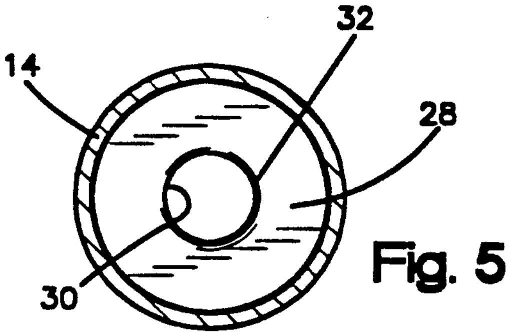
FIG. 5 is a view taken substantially along the plane designated by Line 5—5 of FIG. 1.
Figure 6:
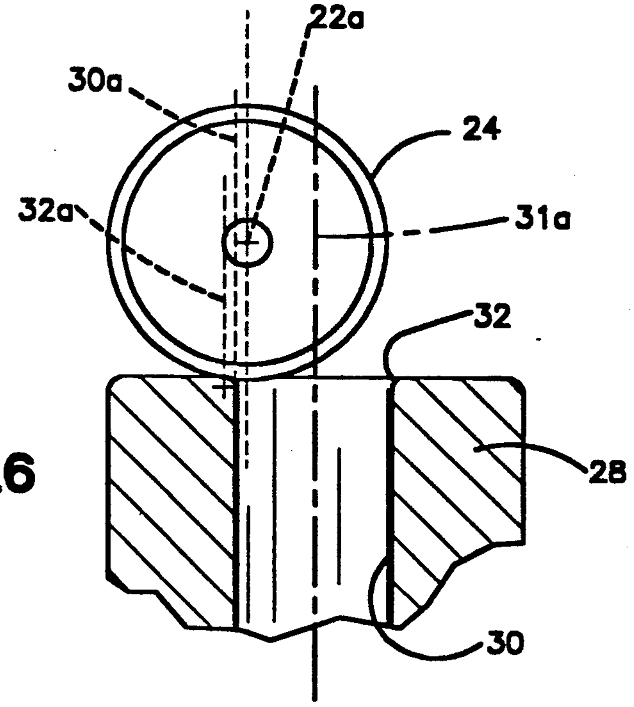
FIG. 6 is a detail view somewhat schematic showing the constraint of the roller defining the actuated position.

The handle section 12 includes a cylindrical plug or slider 28 slidably mounted in the tubular member 14. As can best be seen in FIG. 5, the cylindrical plug 28 is symmetrical around the outside having a continuous cylindrical outer surface so that it can be slidably engaged in the tubular member 14 in any rotative orientation, the orientation being noncritical as will become apparent presently. Plug 28 is provided with a central axial cylindrical bore 30 having a central axis 30*a* (FIG. 6). It is preferred that the bore extend therethrough which allows for insertion of the plug in either orientation, thus making the assembly of the plug in the tubular member totally noncritical both with respect to rotative orientation and axial orientation.

Figure 1:
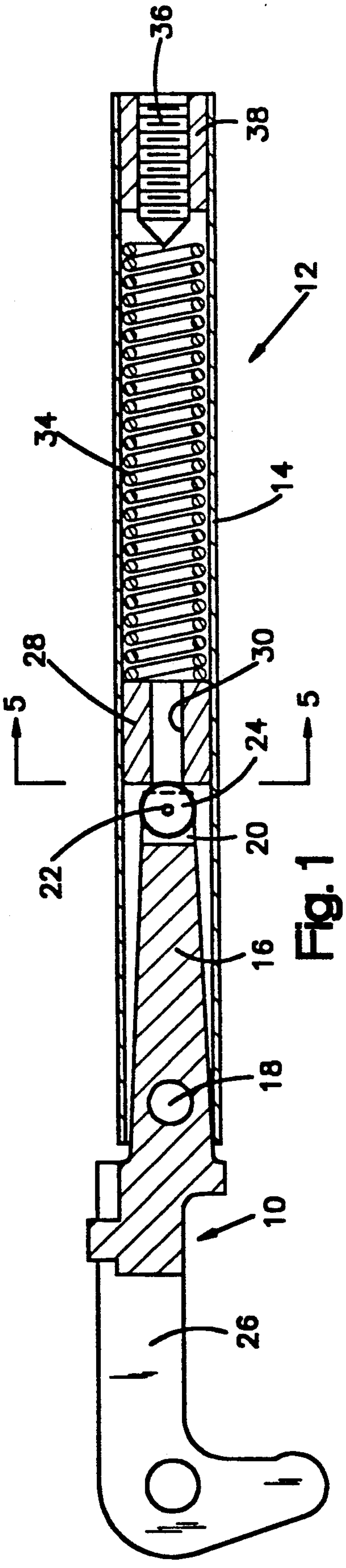
FIG. 1 is a longitudinal sectional view of a torque release handle according to the present invention shown in its normal position.

As can best be seen in FIG. 1, the plug or slider 28 is slidably movable in the tubular-member 14 and is biased into engagement with the roller member 24 by means of a coil spring 34, the force of which spring can be adjusted by means of screw 36 extending through end cap 38. Changing the spring force will change the torque level at which the tool release or actuates.

As was described above, the roller 24, which is larger in diameter than the bore 30, has an outer surface which is shaped as a segment or portion of a surface of a sphere, the curvature of the sphere conforming to the curvature of the central bore 30 of the plug 20. Thus, in the normal position as shown in FIG. 1, when, the plug 20 is biased into engagement with the roller 24, the surface of the roller will engage the surface of the central bore 30 in line contact rather than in point contact as would be the case if the outer surface of the roller 24 were cylindrical rather than spherical or spheroidal. This is an important advantage in allowing maximum rolling contact of the roller with the surface of the central bore 30. Also, it will be noted that since therefore 30 is central and axial to the plug 28, the rotative orientation of the plug 28 is immaterial, and it can be inserted and maintained or rotated to any rotative position within the tubular member 14, the rotative orientation being noncritical.

It has also been found that it is preferable to slightly round the extreme ends of the bore 30 as shown at 32. This will provide for a more uniform response of the tool since in operation the repeated movement of the roller from the position shown in FIG. 1 to that in FIG. 2 will tend to round the corners anyway, and thus, by providing a predetermined, given rounded shape to the corners any change in response as the tool is used repetitively will be reduced or eliminated.

Figure 2:
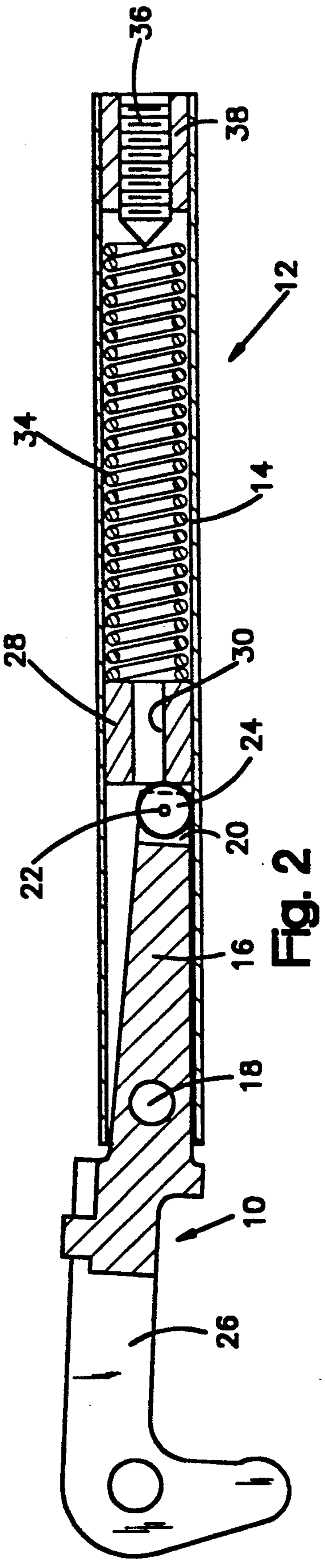
FIG. 2 is a longitudinal sectional view similar FIG. 1 of the torque release handle shown in its actuated position.

When the torque applied to the tool exceeds a preselected level as set by the spring 34, the plug, or slider 28 moves axially in a translation motion in the tubular member allowing the jaw section 10 to pivot on pivot pin 18 as shown in FIG. 2. The tool is also designed such that when the tool is actuated or released due to the torque exceeding the pre-selected level as set by the spring 34, the axis of the roller does not move past the locus of the outer extremity of the edge of the rounded bore 32 and preferably does not move past the locus of the outer extremity of the central portion of the bore 30. This constraint is depicted in FIG. 6 wherein the locus of the axis of axle 22 is designated by the line 22*a*, the locus of the wall bore 30 is designated by the line 30*a*, a locus of the extreme point of the rounded edge 32 is designated by the reference character 32*a*. Normally, the locus of the axis 22*a* of axle 22 lies on the locus of the axis 31*a* of the bore 30. As can be seen in FIG. 6, when the roller 24 moves out of the central location in the bore 30 to the actuated position as shown in FIG. 2, the inner wall of the tubular section 14 limits or constrains the movement of the roller 24 to cease before axis 22*a* of the axle 22 passes beyond the locus 30*a* of the end wall 30 and well before it passes beyond the locus 32*a* of the rounded portion 32 of the wall. This serves a very important function in that it assures that when the predetermined torque level has been released the roller will return back to the position shown in FIG. 1 from that shown in FIG. 2. This is because the position shown in FIG. 6 is essentially an unstable position in that the roller has not completely left the confines of the bore 30 and the rounded portion 32, and thus, under the urging of the spring 34 the bias of the mechanism is to return to the position shown in FIG. 1 rather than to be driven to stay in the position shown in FIG. 2 and be held against the wall. Thus, the unstable structure of FIG. 2, created by the positioning of the axis 22*a* of the axle 22 with respect to the loci 30*a* and 32*a* of the bore walls 30 and 32 and the bias of the spring 34, assures that the mechanism will return to the position shown in FIG. 1 after torque has been released and not remain in the actuated position.

While one embodiment of the invention has been shown and described, various adaptations and modifications can be made without departing from the scope of the invention as defined in the appended claims.

What is claimed is:

1. A hand tool comprising at least one handle which will provide a tactile response when a torque load greater than a given value is applied, said handle comprising first and second elements telescopingly and pivotally engaging each other, one of said elements including generally cylindrical wall means defining an opening having a central axis, and the other of said elements having roller means journaled for potation on an axle, said roller means and said one element being translationally movable with respect to each other, said roller means having a diameter larger than the diameter of the opening and having a surface formed thereon tó conform in axial cross section to the surface configuration of said wall means of said one element;

biasing means normally urging said roller means and said wall biasing means into contact with each other with the axis of the roller means essentially intersecting the locus of the axis of said opening in said one element, and configured to allow said sections to pivot with respect to each other responsive to a predetermined torque by permitting said roller to roll on the wall means to a position with the axis of the roller spaced from the locus of the axis of the opening in the one element; and means to limit the amount of pivotal movement of the roller means out of said opening to a distance such that the axis of said axle is confined within the locus of the surface of the opening of said one element;

whereby when a pre-determined torque falls below the given value, the roller will return to the opening with the axis of the axle of the roller essentially intersecting the locus of the central axis to the opening of said one element.

2. The invention as defined in claim 1 wherein said roller means has a surface configuration which is generally a portion of the surface of a sphere.

3. The invention is defined in claim 2 wherein said one element includes a tubular member and the means to limit the amount of movement of the roller means includes the inner surface of said tubular member.

4. The invention is defined in claim 3 wherein said one element includes a cylindrical plug axially slidably disposed therein, said plug having an opening defining said wall means.

5. The invention is defined claim 4 further characterized by means to vary the value of said torque load including coil spring means normally biasing said plug into engagement with said roller means, and means to vary the load on said spring.

6. The invention is defined in claim 5, further characterized by axially adjustable screw means engaging said coil spring means.

7. The invention is defined in claim 1 wherein said opening includes a generally cylindrical portion and an end portion which is arcuate in transverse section.

8. The invention is defined in claim 1 wherein said axle is mounted in a yoke.

9. In a hand tool having at least one handle, the improvement comprising;

said one handle having first and second elements disposed in a telescoping, pivotally interconnected relationship;

detent means interacting between said first and second elements to provide a tactile response, responsive to a torque force applied to said one handle which exceeds a predetermined value, said detent means including roller means journaled on an axle carried by one element and an opening defined by wall means having a central axis formed in the other element;

said roller means and said other element being translationally movable with respect to each other, said wall means including a section generally circular in transverse section and having an extreme end surrounding said opening;

said roller means having a surface thereon shaped in axial section to mate with the extreme end of said wall means and disposed to rollingly engage said wall means;

biasing means normally biasing said roller means into said opening yet permitting limited pivotal movement out of engagement with said wall means before an applied torque exceeds said predetermined value; and means to constrain said roller means in contact with said extreme end of the wall means, and to constrain said movement of said rolled out of engagement with said wall means to a position that will cause said roller to return to said opening when the torque is reduced below said predetermined value.

10. The invention is defined in claim 9 wherein means are provided to vary the load of the biasing means to thereby vary said predetermined value.

* * * * *